US012681316B2

(12) United States Patent
Cincione et al.

(10) Patent No.: US 12,681,316 B2
(45) Date of Patent: Jul. 14, 2026

(54) DISPLAY DEVICES WITH OPTICAL SENSOR WAVEGUIDE

(71) Applicant: Apple Inc., Cupertino, CA (US)

(72) Inventors: Dominic P Cincione, Los Angeles, CA (US); Brian S Lau, Seattle, WA (US); Hyungryul Choi, San Jose, CA (US); Scott M DeLapp, San Diego, CA (US)

( * ) Notice: Subject to any disclaimer, the term of this patent is extended or adjusted under 35 U.S.C. 154(b) by 0 days.

(21) Appl. No.: 19/034,049

(22) Filed: Jan. 22, 2025

(65) Prior Publication Data

US 2025/0164813 A1 May 22, 2025

Related U.S. Application Data

(63) Continuation of application No. PCT/US2023/071530, filed on Aug. 2, 2023.

(60) Provisional application No. 63/398,471, filed on Aug. 16, 2022.

(51) Int. Cl.
*G02B 27/01* (2006.01)
*G09G 3/00* (2006.01)

(52) U.S. Cl.
CPC ..... *G02B 27/0179* (2013.01); *G02B 27/0172* (2013.01); *G09G 3/002* (2013.01); *G02B 2027/0125* (2013.01); *G02B 2027/0129* (2013.01); *G02B 2027/0181* (2013.01); *G02B 2027/0187* (2013.01); *G09G 2320/0693* (2013.01)

(58) Field of Classification Search
CPC .............. G02B 27/017; G02B 27/0172; G02B 27/0179; G02B 2027/0125; G02B 2027/0129; G02B 2027/0181; G02B 2027/0187; G09G 3/002; G09G 2320/0693

See application file for complete search history.

(56) References Cited

U.S. PATENT DOCUMENTS

| | | | |
|---|---|---|---|
| 2018/0074578 A1 | 3/2018 | Robbins et al. | |
| 2018/0098056 A1 | 4/2018 | Bohn | |
| 2019/0155046 A1 | 5/2019 | Wall et al. | |
| 2020/0018968 A1* | 1/2020 | Edwin | G02B 6/0015 |
| 2020/0278544 A1 | 9/2020 | Poulad et al. | |
| 2021/0096371 A1* | 4/2021 | Tammela | G02B 27/0101 |
| 2022/0004007 A1 | 1/2022 | Bhakta et al. | |

(Continued)

OTHER PUBLICATIONS

U.S. Appl. No. 17/203,612, filed Mar. 16, 2021.

*Primary Examiner* — Cory A Almeida
(74) *Attorney, Agent, or Firm* — Treyz Law Group, P.C.; Michael H. Lyons

(57) ABSTRACT

An electronic device may include a first projector, a first waveguide, a second projector, a second waveguide, and an optical sensor that couples the first waveguide to the second waveguide. A third waveguide may overlap the first waveguide, the second waveguide, and the optical sensor. The third waveguide may direct first image light from the first waveguide to the optical sensor and may direct second image light from the second waveguide to the optical sensor. The optical sensor may gather image sensor data from first image light and the second image light. The image sensor data may be free from errors in the first image light relative to the second image light associated with forces applied around the optical sensor. Control circuitry may calibrate optical misalignment in the device by adjusting the first and/or second image light based on the image sensor data.

20 Claims, 9 Drawing Sheets

(56)        References Cited

U.S. PATENT DOCUMENTS

| 2023/0239455 | A1 | 7/2023 | Churin et al. |
| 2024/0402500 | A1 | 12/2024 | Kalinowski et al. |

* cited by examiner

CONDITION DETECTION ～130

MEASURE POSITION INFORMATION USING POSITION SENSORS AND MEASURE OPTICAL BRIDGE SENSOR IMAGE DATA USING OPTICAL SENSOR ～132

CALIBRATE OPTICAL ALIGNMENT ～134

DISPLAY DEVICES WITH OPTICAL SENSOR WAVEGUIDE

This application is a continuation of international patent application No. PCT/US2023/071530, filed Aug. 2, 2023, which claims priority to U.S. provisional patent application No. 63/398,471, filed Aug. 16, 2022, which are hereby incorporated by reference herein in their entireties.

FIELD

This relates generally to electronic devices, and, more particularly, to electronic devices such as head-mounted devices.

BACKGROUND

Electronic devices have components such as displays and other optical components. During operation, there is a risk that components may become misaligned with respect to each other due to drop events and other undesired high-stress events. This poses challenges for ensuring satisfactory component performance.

SUMMARY

A head-mounted device such as a pair of glasses may have a head-mounted housing. The head-mounted device may include displays such as projector displays and may include associated optical components. The housing may have a first portion, a second portion, and a nose bridge that couples the first portion to the second portion. A first display having a first projector and a first waveguide may be mounted in the first portion of the housing. A second display having a second projector and a second waveguide may be mounted in the second portion of the housing.

An optical bridge sensor may be disposed in the nose bridge and may couple the first waveguide to the second waveguide. The first projector may produce first image light coupled into the first waveguide. The first waveguide may direct a first portion of the first image light to a first eye box and may direct a second portion of the first image light to the optical bridge sensor. The second waveguide may direct a first portion of the second image light to a second eye box and may direct a second portion of the second image light to the optical bridge sensor. The optical bridge sensor may gather image sensor data from the second portion of the first and second image light. Control circuitry may calibrate optical misalignment in the device by adjusting the first and/or second image light based on the image sensor data.

The optical bridge sensor may include a single optical sensor. The optical bridge sensor may include optics that direct the second portion of the first image light and the second portion of the second image light to the optical sensor. The optical sensor may gather the image sensor data. The optics may include, for example, a third waveguide. The third waveguide may have a first input coupler for the second portion of the first image light. The third waveguide may have a second input coupler for the second portion of the second image light. The third waveguide may have an output coupler for the second portion of the first image light and the second image light. This type of implementation may prevent the introduction of errors in the image sensor data between the first image light and the second image light due to forces applied at or around the optical bridge sensor.

DETAILED DESCRIPTION

A system may include one or more electronic devices. Each device may contain optical components and other components. During operation, the positions of these components and the devices may be monitored using position sensors. Using position information from the sensors and/or other sensor data, devices in the system may coordinate operation, may perform calibration operations to compensate for measured component misalignment, and/or may take other actions.

Figure 1:
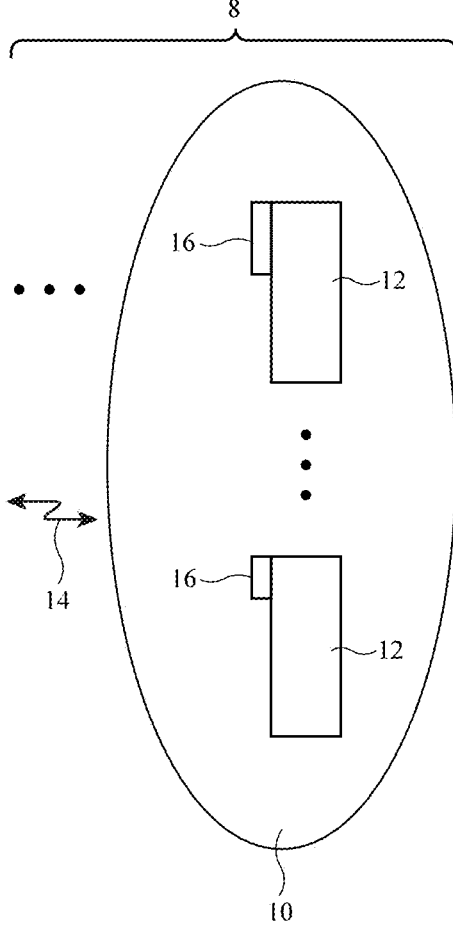
FIG. 1 is a diagram of an illustrative system in accordance with some embodiments.

FIG. 1 is a schematic diagram of an illustrative system of the type that may include one or more electronic devices with position sensors. As shown in FIG. 1, system 8 may include electronic devices 10. Devices 10 may include head-mounted devices (e.g., goggles, glasses, helmets, and/or other head-mounted devices), cellular telephones, tablet computers, peripheral devices such as headphones, game controllers, and/or other input devices. Devices 10 may, if desired, include laptop computers, computer monitors containing embedded computers, desktop computers, media players, or other handheld or portable electronic devices, smaller devices such as wristwatch devices, pendant devices, ear buds, or other wearable or miniature devices, televisions, computer displays that do not contain embedded computers, gaming devices, remote controls, embedded systems such as systems in which equipment is mounted in a kiosk, in an automobile, airplane, or other vehicle, removable external cases for electronic equipment, straps, wrist bands or head bands, removable covers for electronic devices, cases or bags that receive and carry electronic equipment and other items, necklaces or arm bands, wallets, sleeves, pockets, or other structures into which electronic equipment or other items may be inserted, part of an item of clothing or other wearable item (e.g., a hat, belt, wrist band, headband, sock, glove, shirt, pants, etc.), or equipment that implements the functionality of two or more of these devices.

With one illustrative configuration, which may sometimes be described herein as an example, system 8 includes a head-mounted device such as a pair of glasses (sometimes referred to as augmented reality glasses). System 8 may also include peripherals such as headphones, game controllers, and/or other input-output devices (as examples). In some scenarios, system 8 may include one or more stand-alone devices 10. In other scenarios, multiple devices 10 in system 8 exchange information using wired and/or wireless links, which allows these devices 10 to be used together. For example, a first of devices 10 may gather user input or other input that is used to control a second of devices 10 (e.g., the first device may be a controller for the second device). As another example, a first of devices 10 may gather input that is used in controlling a second device 10 that, in turn, displays content on a third device 10.

Devices 10 may include components 12. Components 12 may include control circuitry. The control circuitry may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in the control circuitry may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and/or to support communications between equipment in system 8 and external electronic equipment, devices 10 may include wired and/or wireless communications circuitry. The communications circuitry of devices 10, which may sometimes be referred to as control circuitry and/or control and communications circuitry, may include antennas, radio-frequency transceiver circuitry, and other wireless communications circuitry and/or wired communications circuitry. The communications circuitry of devices 10 may, for example, support bidirectional wireless communications between devices 10 over wireless links such as wireless link 14 (e.g., a wireless local area network link, a near-field communications link, or other suitable wired or wireless communications link (e.g., a Bluetooth® link, a WiFi® link, a 60 GHz link or other millimeter wave link, etc.). Components 12 may also include power circuits for transmitting and/or receiving wired and/or wireless power and may include batteries.

Components 12 may include input-output devices. The input-output devices may be used in gathering user input, in gathering information on the environment surrounding the user, and/or in providing a user with output. The input-output devices may include sensors such as force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, and/or other sensors. In some arrangements, devices 10 may use sensors and/or other input-output devices to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

Components 12 may include haptic output devices. The haptic output devices can produce motion that is sensed by the user (e.g., through the user's head, hands, or other body parts). Haptic output devices may include actuators such as electromagnetic actuators, motors, piezoelectric actuators, electroactive polymer actuators, vibrators, linear actuators, rotational actuators, actuators that bend bendable members, etc.

If desired, input-output devices in components 12 may include other devices such as displays (e.g., to display images for a user), status indicator lights (e.g., a light-emitting diode that serves as a power indicator, and other light-based output devices), speakers and other audio output devices, electromagnets, permanent magnets, structures formed from magnetic material (e.g., iron bars or other ferromagnetic members that are attracted to magnets such as electromagnets and/or permanent magnets), etc.

As shown in FIG. 1, sensors such as position sensors 16 may be mounted to one or more of components 12. Position sensors 16 may include accelerometers, magnetic sensors such as compass sensors, gyroscopes, and/or inertial measurement units (IMUs) that contain some or all of these sensors. Position sensors 16 may be used to measure location (e.g., location along X, Y, and Z axes), orientation (e.g., angular orientation around the X, Y, and Z axes), and/or motion (changes in location and/or orientation as a function of time). Sensors such as position sensors 16 that can measure location, orientation, and/or motion may sometimes be referred to herein as position sensors, motion sensors, and/or orientation sensors.

Devices 10 may use position sensors 16 to monitor the position (e.g., location, orientation, motion, etc.) of devices 10 in real time. This information may be used in controlling one or more devices 10 in system 8. As an example, a user may use a first of devices 10 as a controller. By changing the position of the first device, the user may control a second of devices 10 (or a third of devices 10 that operates in conjunction with a second of devices 10). As an example, a first device may be used as a game controller that supplies user commands to a second device that is displaying an interactive game.

Devices 10 may also use position sensors 16 to detect any changes in position of components 12 with respect to the housings and other structures of devices 10 and/or with respect to each other. For example, a given one of devices 10 may use a first position sensor 16 to measure the position of a first of components 12, may use a second position sensor 16 to measure the position of a second of components 12, and may use a third position sensor 16 to measure the position of a third of components 12. By comparing the measured positions of the first, second, and third components (and/or by using additional sensor data), device 10 can determine whether calibration operations should be performed, how calibration operations should be performed, and/or when/how other operations in device 10 should be performed.

Figure 2:
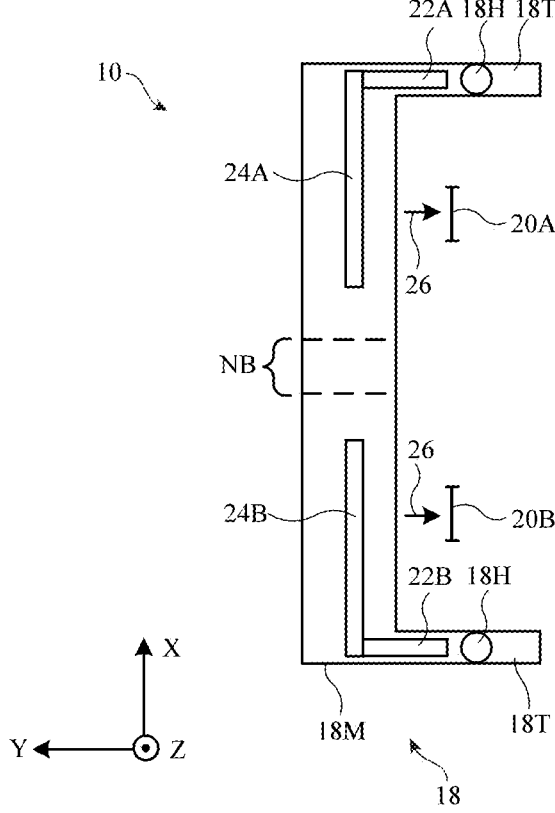
FIG. 2 is a top view of an illustrative head-mounted device in accordance with some embodiments.

In an illustrative configuration, devices 10 include a head-mounted device such as a pair of glasses (sometimes referred to as augmented reality glasses). A top view of device 10 in an illustrative configuration in which device 10 is a pair of glasses is shown in FIG. 2. A shown in FIG. 2, device 10 may include housing 18. Housing 18 may include a main portion (sometimes referred to as a glasses frame) such as main portion 18M and temples 18T that are coupled to main portion 18M by hinges 18H. Nose bridge portion NB may have a recess that allows housing 18 to rest on a nose of a user while temples 18T rest on the user's ears.

Images may be displayed in eye boxes 20 using displays 22 and waveguides 24. Displays 22 may sometimes be referred to herein as projectors 22, projector displays 22, display projectors 22, light projectors 22, image projectors 22, light engines 22, or display modules 22. Projector 22 may include a first projector 22B (sometimes referred to herein as left projector 22B) and a second projector 22A (sometimes referred to herein as right projector 22A). Projectors 22A and 22B may be mounted at opposing right and left edges of main portion 18M of housing 18, for example. Eye boxes 20 may include a first eye box 20B (sometimes referred to herein as left eye box 20B) and may include a second eye box 20A (sometimes referred to herein as right eye box 20A). Waveguides 24 may include a first waveguide 24B (sometimes referred to herein as left waveguide 24B) and a second waveguide 24A (sometimes referred to herein as right waveguide 24A). Main portion 18M of housing 18 may, for example, have a first portion that includes first projector 22B and first waveguide 24B and a second portion that includes second projector 22A and second waveguide 24A (e.g., where nose bridge NB separates the first and second portions such that the first portion is at a first side of the nose bridge and the second portion is at a second side of the nose bridge).

Waveguides 24 may each include one or more stacked substrates (e.g., stacked planar and/or curved layers sometimes referred to herein as waveguide substrates) of optically transparent material such as plastic, polymer, glass, etc. If desired, waveguides 24 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguides 24 may include holographic phase gratings such as volume holograms or thin-film holograms, meta-gratings, or any other desired diffractive grating structures. The diffractive gratings on waveguides 24 may also include surface relief gratings (SRGs) formed on one or more surfaces of the substrates in waveguides 24, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Waveguides 24 may have input couplers that receive light from projectors 22. This image light is then guided laterally (along the X axis) within waveguides 24 in accordance with the principal of total internal reflection. Each waveguide 24 may have an output coupler in front of a respective eye box 20. The output coupler couples the image light out of the waveguide 24 and directs an image towards the associated eye box 20 for viewing by a user (e.g., a user whose eyes are located in eye boxes 20), as shown by arrows 26. Input and output couplers for device 10 may be formed from diffractive gratings (e.g., surface relief gratings, volume holograms, etc.) and/or other optical structures.

For example, as shown in FIG. 2, first projector 22B may emit (e.g., produce, generate, project, or display) image light that is coupled into first waveguide 24B (e.g., by a first input coupler on first waveguide 24B). The image light may propagate in the +X direction along first waveguide 24B via total internal reflection. The output coupler on first waveguide 24B may couple the image light out of first waveguide 24B and towards first eye box 20B (e.g., for view by the user's left eye at first eye box 20B). Similarly, second projector 22A may emit (e.g., produce, generate, project, or display) image light that is coupled into second waveguide 24A (e.g., by a second input coupler on second waveguide 24A). The image light may propagate in the −X direction along second waveguide 24A via total internal reflection. The output coupler on second waveguide 24A may couple the image light out of second waveguide 24A and towards second eye box 20A (e.g., for view by the viewer's right eye at second eye box 20A).

Figure 3:
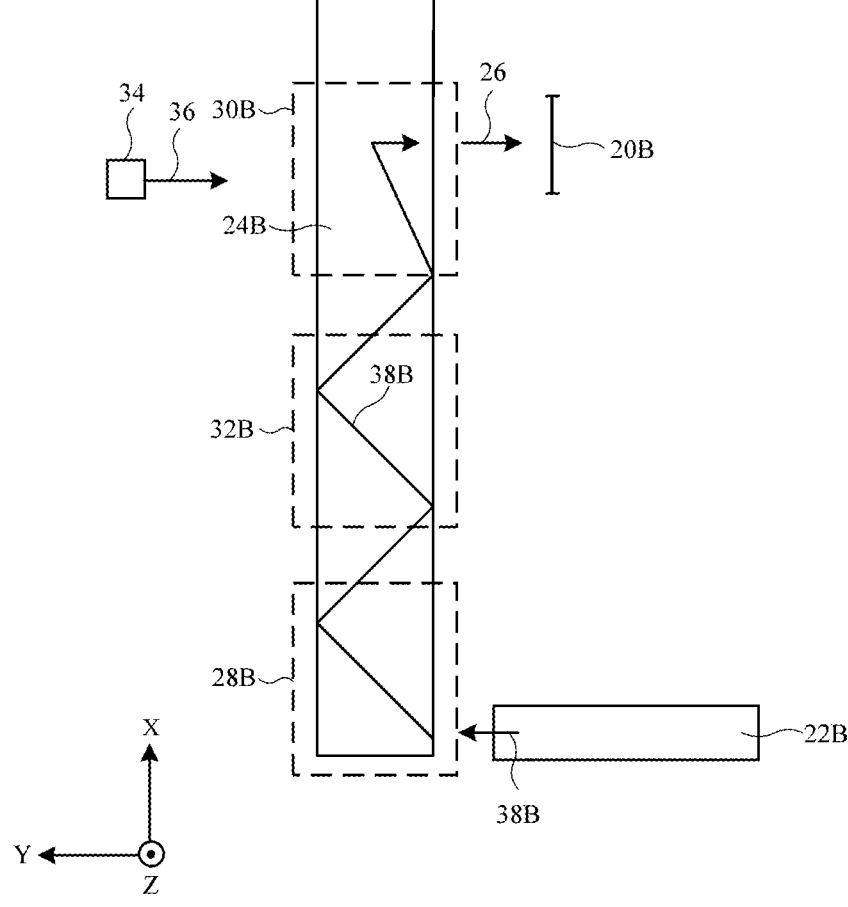
FIG. 3 is a top view of an illustrative display projector and waveguide for providing image light and world light to an eye box in accordance with some embodiments.

FIG. 3 is a top view showing how first waveguide 24B may provide light to first eye box 20B. As shown in FIG. 3, first projector 22B may emit image light 38B that is provided to first waveguide 24B. First projector 22B may include collimating optics (sometimes referred to as an eyepiece, eyepiece lens, or collimating lens) that help direct image light 38B towards first waveguide 24B. First projector 22B may generate image light 38B associated with image content to be displayed to (at) first eye box 20B. First projector 22B may include light sources that produce image light 38B (e.g., in scenarios where first projector 22B is an emissive display module, the light sources may include arrays of light emitters such as LEDs) or may include light sources that produce illumination light that is provided to a spatial light modulator first projector 22B. The spatial light modulator may modulate the illumination light with (using) image data (e.g., a series of image frames) to produce image light 38B (e.g., image light that includes images as identified by the image data). The spatial light modulator may be a transmissive spatial light modulator (e.g., may include a transmissive display panel such as a transmissive LCD panel) or a reflective spatial light modulator (e.g., may include a reflective display panel such as a DMD display panel, an LCOS display panel, an fLCOS display panel, etc.).

First waveguide 24B may be used to present image light 38B output from first projector 22B to first eye box 24B. First waveguide 24B may include one or more optical couplers such as input coupler 28B, cross-coupler 32B, and output coupler 30B. In the example of FIG. 3, input coupler 28B, cross-coupler 32B, and output coupler 30B are formed at or on first waveguide 24B. Input coupler 28B, cross-coupler 32B, and/or output coupler 30B may be completely embedded within the substrate layers of first waveguide 24B, may be partially embedded within the substrate layers of first waveguide 24B, may be mounted to first waveguide 24B (e.g., mounted to an exterior surface of first waveguide 24B), etc.

The example of FIG. 3 is merely illustrative. One or more of these couplers (e.g., cross-coupler 32B) may be omitted. First waveguide 24B may be replaced with multiple waveguides that are laterally and/or vertically stacked with respect to each other. Each of these waveguides may include one, two, all, or none of couplers 28B, 32B, and 30B. First waveguide 24B may be at least partially curved or bent if desired.

First waveguide 24B may guide image light 38B down its length via total internal reflection. Input coupler 28B may be configured to couple image light 38B into first waveguide 24B, whereas output coupler 30B may be configured to couple image light 38B from within waveguide 24B to the exterior of first waveguide 24B and towards first eye box 24B. Input coupler 28B may include an input coupling prism or a diffractive gratings such as an SRG or a set of volume holograms, as examples. As shown in FIG. 3, first projector 22B may emit image light 38B in the +Y direction towards first waveguide 24B. When image light 38B strikes input coupler 28B, input coupler 28B may redirect image light 38B so that the light propagates within first waveguide 24B via total internal reflection towards output coupler 30B (e.g., in the +X direction). When image light 38B strikes output coupler 30B, output coupler 30B may redirect image light 38B out of first waveguide 24B towards first eye box 24B (e.g., back in the −Y direction). In scenarios where cross-coupler 32B is formed at first waveguide 24B, cross-coupler 24B may redirect image light 38B in one or more directions as it propagates down the length of first waveguide 24B, for example.

Input coupler 28B, cross-coupler 32B, and/or output coupler 30B may be based on reflective and refractive optics or may be based on holographic (e.g., diffractive) optics. In arrangements where couplers 28B, 30B, and 32B are formed from reflective and refractive optics, couplers 28B, 30B, and 32B may include one or more reflectors (e.g., an array of micromirrors, partial mirrors, louvered mirrors, or other reflectors). In arrangements where couplers 2B8, 30B, and 32B are based on holographic optics, couplers 28B, 30B, and 32B may include diffractive gratings (e.g., volume holograms, surface relief gratings, etc.). Any desired combination of holographic and reflective optics may be used to form couplers 28B, 30B, and 32B. In one suitable arrangement that is sometimes described herein as an example, input coupler 28B, cross-coupler 32B, and output coupler 30B each include surface relief gratings (e.g., surface relief gratings formed by modulating the thickness of one or more layers of surface relief grating substrate in first waveguide 24B).

In an augmented reality configuration, first waveguide 24B may also transmit (pass) real-world light from the scene/environment in front of (facing) device 10. The real-world light (sometimes referred to herein as world light or environmental light) may include light emitted and/or reflected by objects in the scene/environment in front of device 10. For example, output coupler 30B may transmit world light 36 from real-world objects 34 in the scene/environment in front of device 10. Output coupler 30B may, for example, diffract image light 38B to couple image light 38B out of first waveguide 24B and towards first eye box 20B while transmitting world light 36 (e.g., without diffracting world light 36) to first eye box 20B. This may allow images in image light 38B to be overlaid with world light 36 of real-world objects 34 (e.g., to overlay virtual objects from image data in image light 38B as displayed by first projector 22B with real-world objects 34 in front of the user when viewed at first eye box 20A).

In the example of FIG. 3, only the waveguide and projector for providing image light to first eye box 20B is shown for the sake of clarity. Second waveguide 24A (FIG. 2) may include similar structures for providing light to second eye box 20A. During operation of device 10 (e.g., by an end user), mechanical stresses, thermal effects, and other stressors may alter the alignment between two or more components of device 10. For example, the optical alignment between the components of device 10 may change when the user places device 10 on their head, removes device 10 from their head, places device 10 on a surface or within a case, drops device 10 on the ground, when a mechanical impact event occurs at device 10, when device 10 enters different environments at different temperatures or humidities, when a user bends, stresses, or shakes one or more components in device 10, etc. If care is not taken, these changes in optical alignment can undesirably affect the images provided to eye boxes 20A and 20B (e.g., can produce visible misalignment at one or both eye boxes 20A and 20B). As these changes in optical alignment will vary by user and from system-to-system, it may be desirable to actively identify such changes in the field (e.g., during operation of device 10 by an end user rather than in-factory during the manufacture of device 10) so that suitable action can be taken to mitigate the identified changes to provide an optimal display experience for the user over time.

Figure 4:
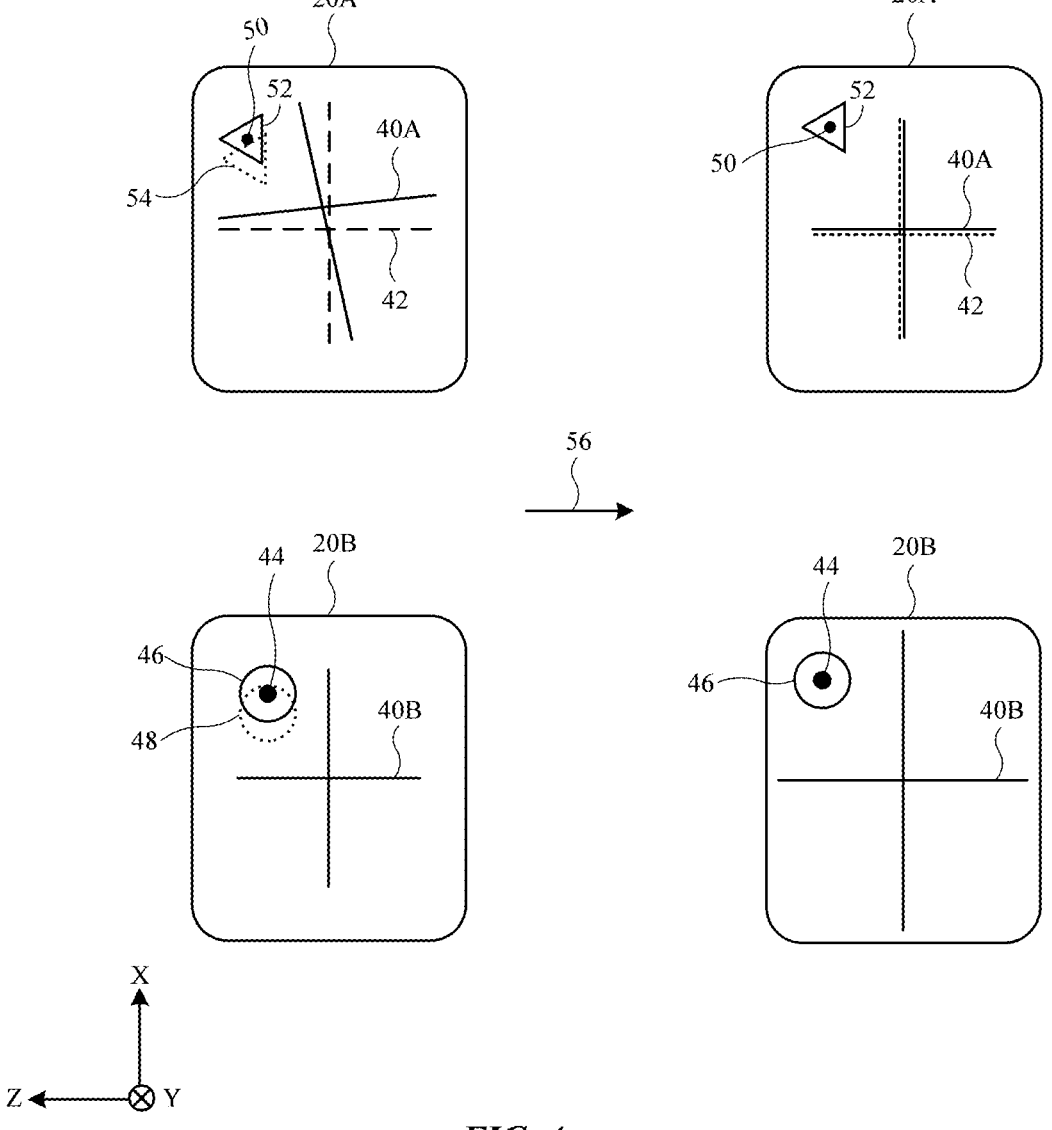
FIG. 4 is a diagram showing how an illustrative system may calibrate optical alignment in the image light provided to left and right eye boxes in accordance with some embodiments.

FIG. 4 is a diagram showing how device 10 may be calibrated to mitigate these changes in optical misalignment. As shown in FIG. 4, image data 40B (e.g., a left image) may be produced by first projector 22B and may be directed to first eye box 20B by first waveguide 24B. Image data 40A (e.g., a right image) may be produced by second projector 22A and may be directed to second eye box 20A by second waveguide 24A.

When first projector 22B and first waveguide 24B (e.g., the first display) are perfectly aligned with respect to second projector 22A and second waveguide 24A (the second display), image data 40A may be displayed at an ideal (nominal) location 42 within second eye box 20A (e.g., a location at which, when a user views eye boxes 20B and 20A with their respective left and right eyes, causes the image data to appear clearly and comfortably to the user given the user's binocular vision). In other words, nominal location 42 may be an expected location for image data 40A based on the binocular vision of the user.

However, when first projector 22B and/or first waveguide 24B become misaligned with respect to second projector 22A and/or second waveguide 24B, image data 40A may be received at second eye box 20A at a location other than nominal location 42, as shown in FIG. 4. This misalignment may present itself as a left-right binocular misalignment, causing virtual objects in image data 40A and/or 40B to appear blurry or misaligned between the eye boxes, or otherwise causing user discomfort when viewing both eye boxes 20A and 20B simultaneously. This left-right binocular misalignment may sometimes also be referred to herein as in-field drift (e.g., where virtual objects in one of the eye boxes drifts within the field of view from a nominal location due to misalignment between the left and right displays). In-field drift or other optical distortions may also be produced by misalignment or changes in alignment between first waveguide 24B and first projector 22B and misalignment between second waveguide 24A and second projector 22A.

If desired, the virtual objects in the image data provided to eye boxes 20A and 20B may be registered to one or more real-world objects 34 in world light 36 (FIG. 3). Real-world object registration involves the use of image sensors such as one or more outward-facing cameras (OFCs) on device 10. The OFCs may capture images of world light 36 to identify the presence of one or more real-world objects in the scene/environment in view of the system. One or more virtual objects in the image data provided to eye boxes 20A and 20B may be placed within the field of view at selected location(s) relative to one or more features or points on the one or more virtual objects detected using the OFCs.

For example, as shown in FIG. 4, a real-world object 44 may be present in the field of view of first eye box 20B and a real-world object 50 may be present in the field of view of second eye box 20A. The image data provided by image light 38B to first eye box 20B may include a virtual object 46 that is registered to real-world object 44 (e.g., such that the virtual object aligns with the real-world object within the field of view of first eye box 20B, overlaps with the real-world object within the field of view of first eye box 20B, is pinned to the real-world object within the field of view of first eye box 20B, tracks the real-world object within the field of view of first eye box 20B, etc.). Similarly, the image data provided by image light 38A to second eye box 20A may include a virtual object 52 that is registered to real-world object 50 (e.g., such that the virtual object aligns with the real-world object within the field of view of second eye box 20A, overlaps with the real-world object within the field of view of second eye box 20A, is pinned to the real-world object within the field of view of second eye box 20A, tracks the real-world object within the field of view of second eye box 20A, etc.). The image data provided to eye boxes 20B and 20A may include the same virtual object(s) provided at different locations between the eye boxes to accommodate binocular viewing of the virtual objects within the eye boxes, for example.

When one or more of the OFCs becomes misaligned with respect to one or more of first projector 22B, first waveguide 24B, second projector 22A, and/or second waveguide 24A (e.g., with respect to the first and/or second display), this may cause the virtual objects in the image data of one or both eye boxes to become misaligned with the real-world objects that the virtual objects are registered to. For example, virtual object 46 in first eye box 20B may become misaligned with respect to real-world object 44, such as at location 48, and/or virtual object 52 in second eye box 20A may become misaligned with respect to real-world object 50, such as at location 54.

Device 10 may perform in-field calibration operations using a set of sensors. In performing in-field calibration operations, the set of sensors may gather (e.g., measure, sense, or generate) sensor data that identifies the amount of optical misalignment in device 10. Control circuitry in device 10 may then perform adjustments to device 10 based on the identified amount of optical misalignment (e.g., to mitigate the identified amount of optical misalignment). The adjustments may include digital adjustments to the image data provided to projectors 22A and/or 22B for display at the eye boxes (e.g., to the image light 38A and/or 38B) such as digital translations, transformations, warping, distortion, or rotations to the image data and/or may include mechanical adjustments to projector 22A (or one or more components therein), projector 22B (or one or more components therein), second waveguide 24A, and/or first waveguide 24B (e.g., using actuators, microelectromechanical systems (MEMs) components, piezoelectric components, etc.). Performing in-field calibration operations in this way may allow device 10 to continue to exhibit proper optical alignment and thereby optimal display performance regardless of how the amount and type of optical misalignment present changes over time (e.g., due to mechanical stress effects and thermal effects on the system, how different users handle and operate the system, etc.).

The in-field calibration operations may serve to mitigate (e.g., calibrate, compensate for, or correct) optical misalignment that may be present in device 10, as shown by arrow 56. Such calibration may, for example, compensate for left-right binocular misalignment between the left and right displays (e.g., aligning image data 40A in second eye box 20A with nominal location 42) and/or may allow for proper registration of virtual objects with real-world objects (e.g., by properly registering virtual object 44 to real-world object 46, by properly registering virtual object 52 to real-world object 50, etc.).

Figure 5:
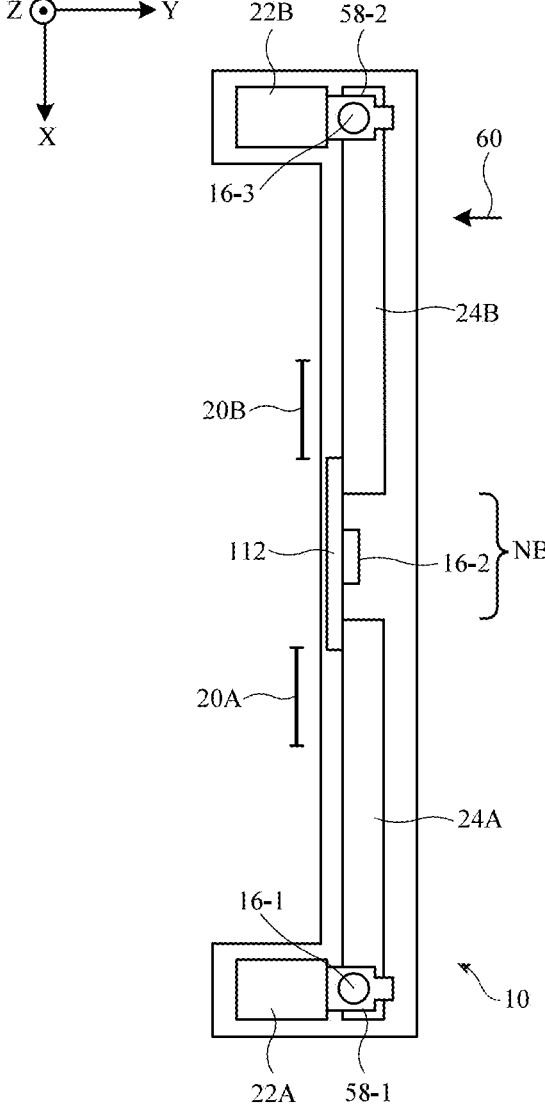
FIG. 5 is a top view of an illustrative head-mounted device having a left position sensor, a right position sensor, a bridge position sensor, and an optical bridge sensor for calibrating optical alignment in accordance with some embodiments.

The set of sensors used to perform in-field calibration operations in device 10 may include at least first, second, and third positional sensors and an optical bridge sensor. FIG. 5 is a cross-sectional top view of the main portion 18M of housing 18 (FIG. 2) showing how device 10 may include at least first, second, and third positional sensors and an optical bridge sensor.

As shown in FIG. 5, first projector 22B may be optically coupled to a first (left) edge of first waveguide 24B (e.g., a temple side/edge of the first waveguide). First waveguide 24B may propagate image light (e.g., image light 38B of FIG. 3) from first projector 22B towards its opposing second (right) edge (e.g., a nose bridge side/edge of the first waveguide). An output coupler (e.g., output coupler 30B of FIG. 5) may be located at or adjacent to the second edge of first waveguide 24B. The output coupler may couple the image light out of first waveguide 24B and may direct the image light towards first eye box 20B. If desired, one or more lens elements (not shown) may help to direct the image light coupled out of first waveguide 24B towards first eye box 20B.

Similarly, second projector 22A may be optically coupled to a first (right) edge of second waveguide 24A (e.g., a temple side/edge of the second waveguide). Second waveguide 24A may propagate image light from first projector 22A towards its opposing second (left) edge (e.g., a nose bridge side/edge of the second waveguide). An output coupler may be located at or adjacent to the second edge of second waveguide 24A. The output coupler may couple the image light out of second waveguide 24A and may direct the image light towards second eye box 20A. If desired, one or more lens elements (not shown) may help to direct the image light coupled out of second waveguide 24A towards second eye box 20A.

As shown in FIG. 5, an optical sensor such as optical bridge sensor 112 may be disposed within nose bridge NB of main portion 18M of the housing. Optical bridge sensor 112 may be coupled to the second edge of first waveguide 24B and may be coupled to the second edge of second waveguide 24A (e.g., optical bridge sensor 112 may bridge nose bridge NB). First waveguide 24B may include an additional output coupler at the second edge of first waveguide 24B. The additional output coupler may couple some of the image light propagating through first waveguide 24B out of first waveguide 24B and into optical bridge sensor 112. Similarly, second waveguide 24A may include an additional output coupler at the second edge of second waveguide 24A. The additional output coupler may couple some of the image light propagating through second waveguide 24A out of second waveguide 24A and into optical bridge sensor 112. Optical bridge sensor 112 may include one or more image sensors that gathers image sensor data (sometimes referred to herein as optical bridge sensor image data) from the image light coupled out of waveguides 24A and 24B. The optical bridge sensor image data may be a real-time representation of the image data that is actually being provided to eye boxes 20A and 20B after propagating from the projectors 22 and through the waveguides 24. The optical bridge sensor image data may therefore allow for real-time measurement of any optical misalignment between the left and right displays in device 10.

Device 10 may also include at least two outward facing cameras 58 such as a first OFC 58-1 and a second OFC 58-2. OFCs 58-1 and 58-2 may capture images of world light 36 (FIG. 3). The captured images may be used to help to identify how device 10 is oriented relative to its environment and surroundings. The captured images may also be used to register real-world objects in the environment to virtual objects in the image data conveyed to eye boxes 20A and 20B (e.g., as shown in FIG. 4). OFCs 58-1 and 58-2 may be disposed at opposing sides of main portion 18M of the housing for device 10 to allow the captured images to be used for binocular vision and three-dimensional depth perception of the environment. For example, as shown in FIG. 5, OFC 58-1 may be disposed at the left side of device 10 and may overlap first projector 22B and/or the first edge of first waveguide 24B. Similarly, OFC 58-2 may be disposed at the right side of device 10 and may overlap second projector 22A and/or the first edge of second waveguide 24A. In other words, OFC 58-2, first projector 22B, and first waveguide 24B may be disposed in a first portion of housing 18, OFC 58-1, second projector 22A, and second waveguide 24A may be disposed in a second portion of housing 18, and nose bridge NB may couple the first portion of housing 18 to the second portion of housing 18.

As shown in FIG. 5, device 10 may include at least three position sensors 16 such as position sensors 16-1, 16-2, and 16-3. Position sensors 16-1, 16-2, and 16-3 may be IMUs, for example. Position sensor 16-3 may be disposed (mounted) at OFC 58-2 and may therefore sometimes be referred to herein as left position sensor 16-3. For example, position sensor 16-3 may be disposed on OFC 58-2 (e.g., on a frame, bracket, or housing of OFC 58-2), may be integrated within OFC 58-2 (e.g., within a frame, bracket, or housing of OFC 58-2), may be adhered or affixed to OFC 58-2 (e.g., using adhesive, screws, springs, pins, clips, solder, etc.), and/or may be disposed on a substrate (e.g., a rigid or flexible printed circuit board) that is layered onto or within OFC 58-2. In general, it may be desirable for position sensor 16-3 to be as tightly coupled to OFC 58-2 as possible so that position/orientation changes measured by position sensor 16-3 are accurate measurements of position/orientation changes of OFC 58-2.

Position sensor 16-1 may be disposed (mounted) at OFC 58-1 and may therefore sometimes be referred to herein as right position sensor 16-1. For example, position sensor 16-1 may be disposed on OFC 58-1 (e.g., on a frame, bracket, or housing of OFC 58-1), may be integrated within OFC 58-1 (e.g., within a frame, bracket, or housing of OFC 58-1), may be adhered or affixed to OFC 58-1 (e.g., using adhesive, screws, springs, pins, clips, solder, etc.), and/or may be disposed on a substrate (e.g., a rigid or flexible printed circuit board) that is layered onto or within OFC 58-1. In general, it may be desirable for position sensor 16-1 to be as tightly coupled to OFC 58-1 as possible so that position/orientation changes measured by position sensor 16-1 are accurate measurements of position/orientation changes of OFC 58-1.

Position sensor 16-2 may be disposed (mounted) at optical bridge sensor 112 and may therefore sometimes be referred to herein as central position sensor 16-2, bridge position sensor 16-2, or optical bridge sensor position sensor 16-2. For example, position sensor 16-2 may be disposed on optical bridge sensor 112 (e.g., on a frame, bracket, or housing of optical bridge sensor 112), may be integrated within optical bridge sensor 112 (e.g., within a frame, bracket, or housing of OFC 58-1), may be adhered or affixed to optical bridge sensor 112 (e.g., using adhesive, screws, springs, pins, clips, solder, etc.), and/or may be disposed on a substrate (e.g., a rigid or flexible printed circuit board) that is layered onto or within optical bridge sensor 112. In general, it may be desirable for position sensor 16-2 to be as tightly coupled to optical bridge sensor 112 as possible so that position/orientation changes measured by position sensor 16-2 are accurate measurements of position/orientation changes of optical bridge sensor 112.

The example of FIG. 5 is merely illustrative. Position sensors 16-1, 16-2, and 16-3 may be disposed at other locations. OFC 58-1 and OFC 58-2 may be disposed at other locations. Additional OFCs 58 may be disposed in main portion of the housing of device 10 or elsewhere on device 10. The additional OFCs may include respective position sensors 16 if desired. Device 10 may include more than three position sensors 16. If desired, one or more non-visible light image sources and image sensors (e.g., infrared emitters and infrared image sensors) may be disposed within device 10 (e.g., on, within, or adjacent to projector 22A, projector 22B, second waveguide 24A, and/or first waveguide 24B) for tracking the direction of a user's gaze within eye boxes 20A and 20B. The infrared light sources and/or infrared light emitters may include position sensors for measuring their position/orientation if desired (e.g., for performing optical alignment calibration for gaze tracking using the systems and methods described herein).

Figure 6:
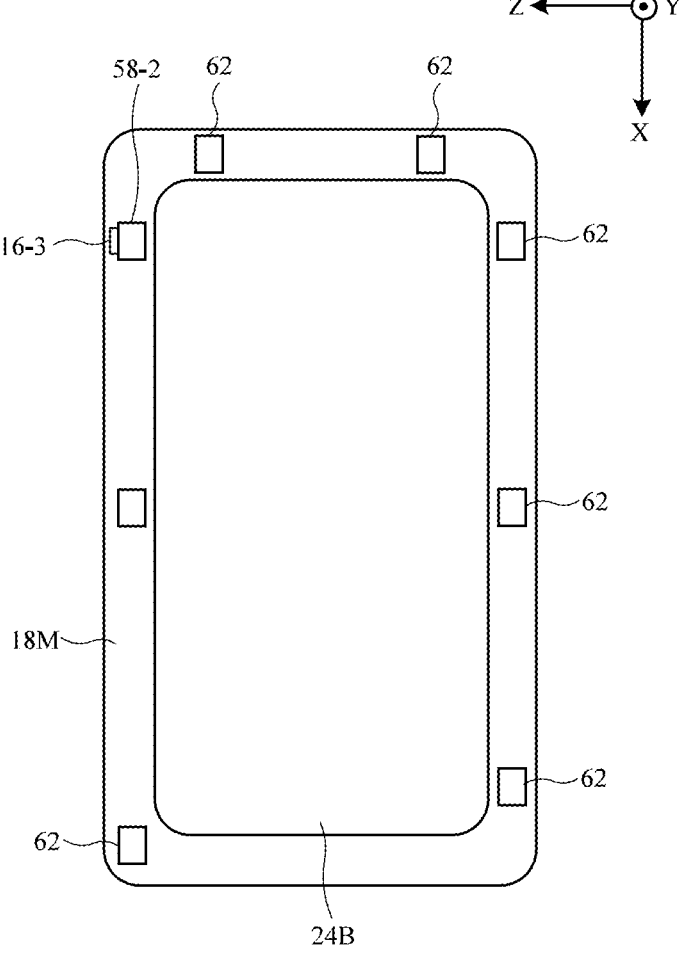
FIG. 6 is a front view showing how an illustrative position sensor and outward-facing camera may be mounted at different locations around the periphery of a waveguide in accordance with some embodiments.

FIG. 6 is a front view of first waveguide 24B (e.g., as viewed in the direction of arrow 60 of FIG. 5). As shown in FIG. 6, first waveguide 24B may be mounted within main portion 18M of the housing for device 10. First waveguide 24B may have a lateral surface in the X-Z plane of the page. The lateral surface of first waveguide 24B may have a periphery. In the example of FIG. 6, OFC 58-2 and its position sensor 16-3 are disposed at the top-right corner of the periphery of first waveguide 24B. This is merely illustrative and, in general, OFC 58-2 and position sensor 16-3 may be disposed at other locations around the periphery of first waveguide 24B, such as at any of locations 62. More than one OFC and position sensor may be disposed around the periphery of first waveguide 24B if desired.

Figure 7:
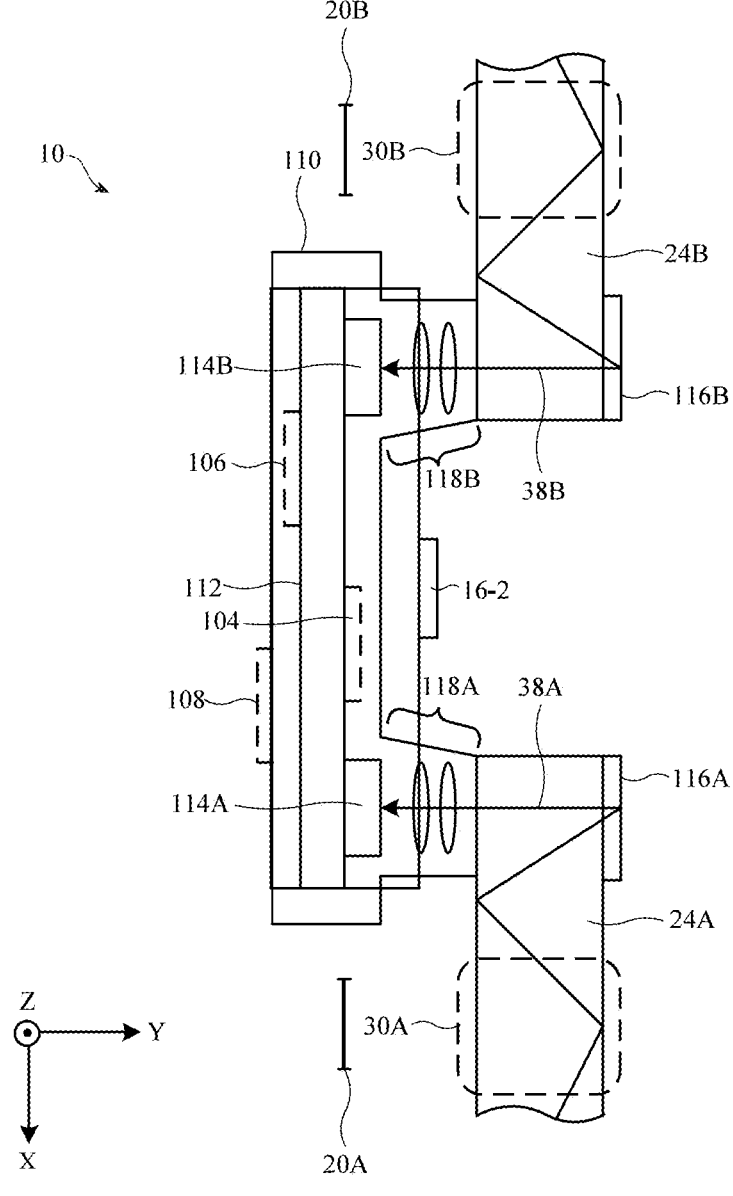
FIG. 7 is a cross-sectional top view of an illustrative optical bridge sensor and bridge position sensor in accordance with some embodiments.

FIG. 7 is a cross-sectional top view of optical bridge sensor 112 and its corresponding position sensor 16-2.

Optical bridge sensor 112 may sometimes also be referred to as an optical misalignment detection sensor, an optical alignment sensor, or an optical misalignment detection module. As shown in FIG. 7, optical bridge sensor 112 may be integrated within a sensor housing 110. Sensor housing 110 may be formed from a part of main portion 18M of housing 18 within nose bridge NB (FIG. 1), may be a separate housing enclosed within nose bridge NB of main portion 18M, may be a frame or bracket that supports housing portion 18M, or may be omitted. Optical bridge sensor 112 (e.g., sensor housing 110) may have a first end mounted to first waveguide 24B and may have an opposing second end mounted to second waveguide 24A (e.g., using optically clear adhesive or other mounting structures).

First waveguide 24B may receive image light 38B from first projector 22B. Second waveguide 24A may receive image light 38A from second projector 22A. First waveguide 24B may have an output coupler 30B that couples a first portion of image light 38B out of the waveguide and towards first eye box 20A. Output coupler 30B may pass a second portion of image light 38B without coupling or diffracting the second portion of image light 38B out of first waveguide 24B. First waveguide 24B may include an additional output coupler 116B (e.g., a set of diffractive gratings such as a surface relief grating or volume holograms, louvered mirrors, an output coupling prism, etc.). Output coupler 116B may couple the second portion of image light 38B out of first waveguide 24B and into optical bridge sensor 112.

Similarly, second waveguide 24A may have an output coupler 30A that couples a first portion of image light 38A out of the waveguide and towards second eye box 20A. Output coupler 30A may pass a second portion of image light 38A without coupling or diffracting the second portion of image light 38A out of second waveguide 24A. Second waveguide 24A may include an additional output coupler 116A (e.g., a set of diffractive gratings such as a surface relief grating or volume holograms, louvered mirrors, an output coupling prism, etc.). Output coupler 116A may couple the second portion of image light 38A out of second waveguide 24A and into optical bridge sensor 112.

Optical bridge sensor 112 may have a first optical sensor 114A and a second optical sensor 114B (e.g., CMOS image sensors, quad cell image sensors, other types of image sensors or cameras, etc.). Optical sensors 114A an 114B may sometimes be referred to herein as image sensors 114A and 114B. If desired, optical bridge sensor 112 may include lens elements 118A that direct the second portion of the image light 38A from output coupler 116A towards image sensor 114A. If desired, optical bridge sensor 112 may also include lens elements 118B that direct the second portion of the image light 38B from output coupler 116B towards image sensor 114B. Image sensors 114A and 114B may gather image sensor data (optical sensor data such as optical bridge sensor image data) from image light 38A and 38B. Control circuitry in device 10 may process the optical bridge sensor image data for use in in-field optical alignment calibration operations. As one example, a specific pixel in projectors 22A/22B may be illuminated. The resultant image on image sensors 114A and 114B may then be used to compute relative misalignment between the left and right eye boxes. Relative clocking measurements may be made via multiple pixels.

Position sensor 16-2 may be mounted at any desired location on or in optical bridge sensor 112. For example position sensor 16-2 may be disposed on optical bridge sensor 112 within sensor housing 110 (e.g., at location 106 facing inwards or location 104 facing outwards) or may be disposed on sensor housing 110 (e.g., at a location facing outwards or at location 108 facing inwards). Position sensor 16-2 may be secured to optical bridge sensor 112 and/or sensor housing 110 using adhesive, screws, springs, pins, clips, solder, etc. If desired, position sensor 16-2 may be formed or mounted to a substrate such as a rigid or flexible printed circuit that is layered onto optical bridge sensor 112 within sensor housing 110 or that is layered onto sensor housing 110.

In the example of FIG. 7, optical bridge sensor 112 includes two image sensors for capturing optical bridge sensor image data from the first and second waveguides respectively. This is merely illustrative. In another suitable arrangement, optical bridge sensor 112 may include a single image sensor for capturing optical bridge sensor image data from both the first and second waveguides.

Figure 8:
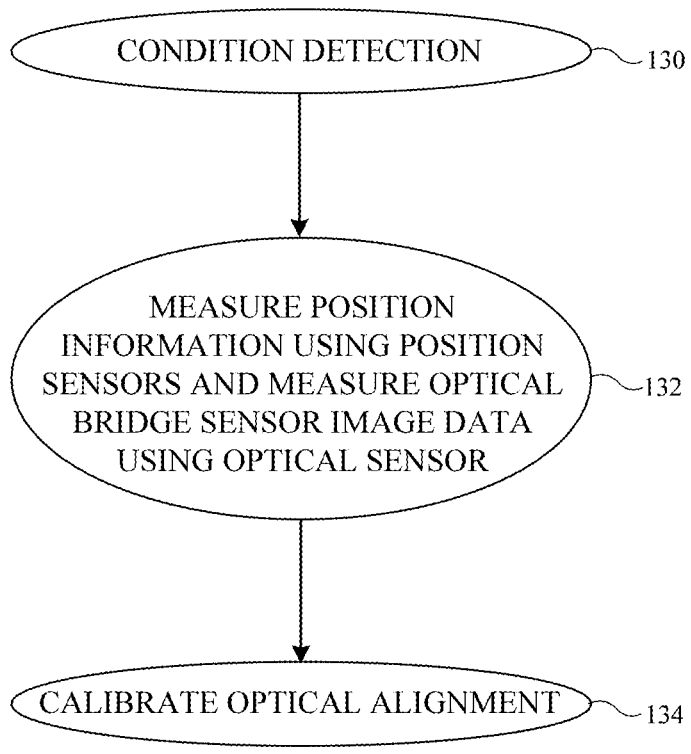
FIG. 8 is a flow chart of illustrative operations involved in using a system to calibrate optical alignment in accordance with some embodiments.

FIG. 8 is a flow chart of illustrative operations that may be performed by device 10 to perform in-field calibration using optical bridge sensor 112 and at least position sensors 16-1, 16-2, and 16-3. At operation 130, device 10 may monitor for conditions indicating that position information should be gathered using position sensors 16 and optical bridge sensor 112. In some scenarios, position sensors 16 and/or optical bridge sensor 112 may be used continuously (e.g., position measurements may be made repeatedly). In other situations, position sensors 16 and/or optical bridge sensor 112 may be inactive until predetermined trigger conditions are detected, at which point the sensors may be powered up and used to make measurements. This approach may help reduce power consumption by allowing position sensors 16 and/or optical bridge sensor 112 to be used only when position data is needed.

Device 10 may, as an example, use an input device such as a touch sensor, microphone, button, or other input device to gather user input from a user (e.g., a user input command indicating that position sensors 16 should gather position measurements and/or that optical bridge sensor 112 should gather optical bridge sensor data so that the optical alignment can be measured and corrected). As another example, an accelerometer, force sensor, or other sensor may be used to detect when devices 10 have been subjected to a drop event or other event that imparts stress to device components (e.g., excessive stress that might cause component misalignment). Devices 10 can also use internal clocks in their control circuitry to measure the current time (e.g., to determine whether a predetermined time for making position sensor measurements has been reached). If desired, operation 130 may be used to detect other conditions for triggering position sensor measurements and/or optical bridge sensor measurements (e.g., detecting when devices 10 have been placed within a storage case or have been removed from a storage case, detecting when device 10 is being powered on or powered off, detecting when wireless commands from another device 10 and/or remote equipment have been received, etc.). These criteria and/or other suitable position sensor measurement criteria may be used to determine when position measurements and/or optical bridge sensor image data should be gathered.

In response to detecting a condition indicating that position measurements and/or optical bridge sensor image data should be gathered, processing may proceed to operation 132. At operation 132, position sensors 16-1, 16-2, and 16-3 may gather position measurements (e.g., may gather position sensor data) and/or optical bridge sensor 112 may gather optical bridge sensor data from image light 38A and 38B. If desired, optical bridge sensor image data measurements may be made periodically (e.g., every X seconds, where X is less than 1 s, 0.5 s, at least 1 s, at least 10 s, at least 100 s, less than 500 s, less than 50 s, less than 5 s, or other suitable time period). Additionally or alternatively, if desired, position measurements may be made periodically (e.g., every Y seconds, where Y is at least 1 s, at least 10 s, at least 100 s, or other periods longer than X). Additional position sensors may gather position measurements of one or more infrared emitters and/or one or more infrared image sensors for calibrating gaze tracking if desired.

At operation 134, device 10 may adjust (e.g., correct, calibrate, alter, etc.) optical alignment between first projector 22B, second projector 22A, first waveguide 24B, and/or second waveguide 24A based on the position measurements and/or the optical bridge sensor image data. The adjustments may include adjustments to the image data displayed at first eye box 20B using the image light 38B produced by first projector 22B and/or adjustments to the image data displayed at second eye box 20A using the image light 38A produced by second projector 22A (e.g., image warping, geometric transforms, image distortion, image translations, etc.) and/or may include mechanical adjustments to one or more of first projector 22B, second projector 22A, first waveguide 24B, and/or second waveguide 24A. For example, in response to determining that binocular misalignment and/or real-world object registration is misoriented with respect to one or both of the displays leading to undesired image warping, the control circuitry of a device may be used to apply a geometric transform to the images being output by the display. The geometric transform may create an equal and opposite amount of image warping, so that the images viewed in the eye boxes are free from misalignment-induced distortion.

As an example, device 10 may calibrate (e.g., correct, compensate, mitigate, etc.) in-field drift between the left and right displays based on the optical bridge sensor image data (e.g., since the optical bridge sensor data is a real-time measure of the image light provided to the eye box by the left and right projectors and is thereby indicative of binocular misalignment). Device 10 may additionally or alternatively register virtual objects in the image data to real-world objects captured using at least OFCs 58-1 and 58-2 based on the optical bridge sensor data and the position measurements gathered using position sensors 16-1, 16-2, and 16-3. Position sensors 16-1, 16-2, and 16-3 may, for example, be used to identify the relative orientation between OFC 58-1 and optical bridge sensor 112, the relative orientation between OFC 58-2 and optical bridge sensor 112, and the relative orientation between OFCs 58-1 and 58-2. As the optical bridge sensor image data measures where virtual objects are presented at the eye boxes relative to their nominal positions, these relative orientations may be used to determine any misalignment between virtual objects themselves and the corresponding real-world objects that the virtual objects are registered to (e.g., since OFCs 58-1 and 58-2 capture the real-world objects and create knowledge in device 10 of the location of the real-world objects within the field of view).

If desired, additional optical alignment calibrations may be performed using the optical bridge sensor data, the position measurements, and/or any other desired sensor data (e.g., using the calibration of left-right binocular alignment (in-field drift) and real-world object registration (relative orientation between OFC 58-1, OFC 58-2, and optical bridge sensor 112) as a baseline calibration). If desired, position measurements of one or more infrared emitters and/or one or more infrared image sensors may be used to adjust and calibrate optical alignment used in gaze tracking operations.

During operation of device 10 by an end user (e.g., in the field), forces may be applied to optical bridge sensor 112 (FIG. 7) that undesirably affect measurements and calibrations performed using optical bridge sensor 112. For example, some portions of sensor housing 110 may bend with respect to other portions of sensor housing 110. These bending forces can be particularly pronounced because the optical bridge sensor is located in nose bridge NB of main portion 18M of the housing for the device, which can be subject to strain whenever the user places device 10 on their head. Such bending may, for example, misalign first image sensor 114A with respect to second image sensor 114 over time (e.g., one of the image sensors may degrade during operation by an end user adding additional error to the system). To mitigate these issues, optical bridge sensor 112 may be provided with a single image sensor that receives both image light 38A and image light 38B via dedicated bridge sensor optics that are in a first reference frame that is different from the reference from of waveguides 24A and 24B.

Figure 9:
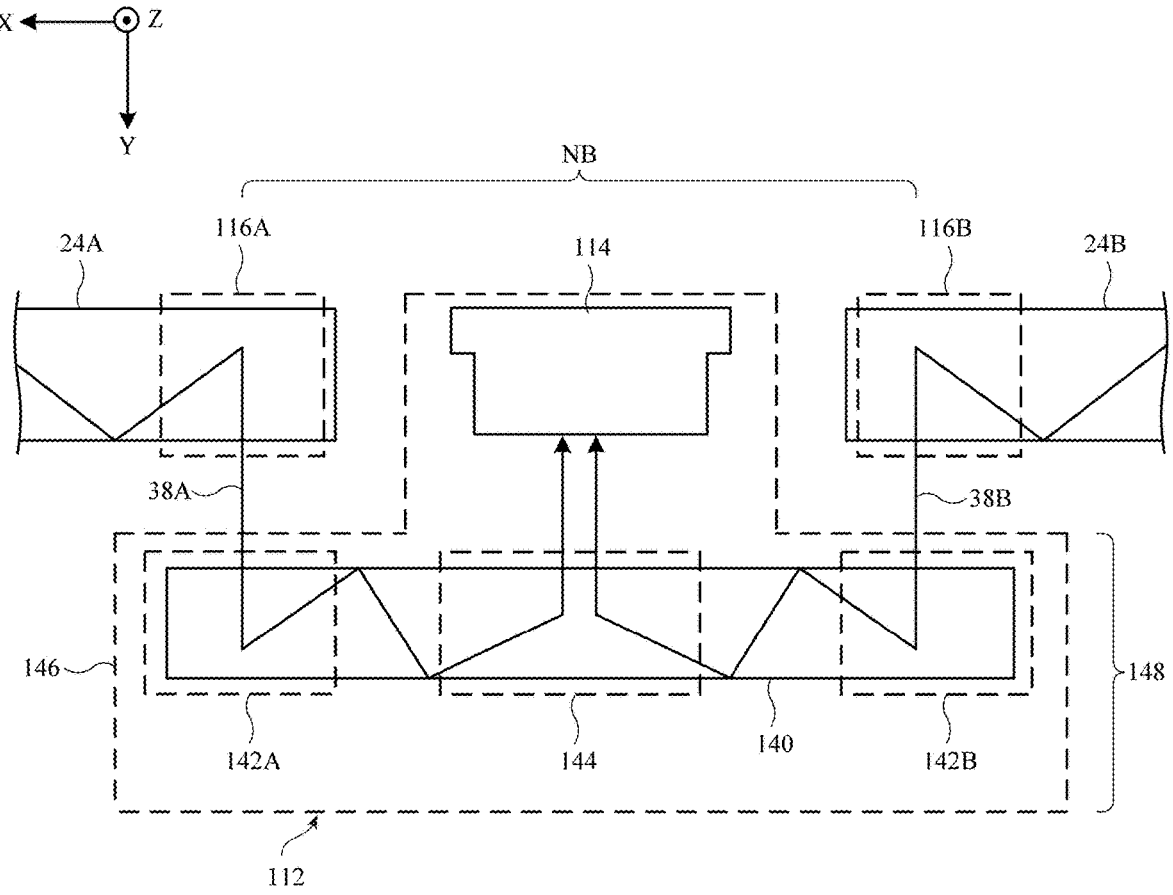
FIG. 9 is a cross-sectional top view of an optical bridge sensor having a single image sensor and a dedicated waveguide for directing image light to the single optical sensor in accordance with some embodiments.

FIG. 9 is a cross-sectional top view showing one example of how optical bridge sensor 112 may include a single image sensor that receives both image light 38A and image light 38B via optical bridge sensor optics. As shown in FIG. 9, optical bridge sensor 112 may include a single optical sensor 114 (e.g., a single image sensor or array of image sensor pixels). Optical bridge sensor 112 may also include bridge sensor optics 148. Optical sensor 114 may, for example, be disposed (interposed) between waveguides 24A and 24B. Bridge sensor optics 148 may be disposed at or facing a world-side of waveguides 24A and 24B, for example. Optical bridge sensor 112 of FIG. 9 may, for example, occupy less volume in device 10 than in the arrangement of FIG. 7.

Output coupler 116A on waveguide 24A may couple image light 38A out of waveguide 24A and towards bridge sensor optics 148. Output coupler 116B on waveguide 24B may couple image light 38B out of waveguide 24B and towards bridge sensor optics 148. Bridge sensor optics 148 may direct image light 38A and image light 38B towards optical sensor 114 (e.g., within a single field of view or two respective fields of view on the imaging surface of optical sensor 114). Optical sensor 114 may gather optical bridge sensor data in response to image light 38A and 38B.

Optical sensor 114 and bridge sensor optics 148 may be disposed within nose bridge NB of the housing 18 of device 10. Waveguides 24A and 24B may be mounted to housing 18 within a first reference frame. Optical sensor 114 and bridge sensor optics 148 may be mounted to housing 18 (e.g., using a mounting bracket, frame, or other structures) within a second reference frame 146. Any forces or bending applied to reference frame 146 will therefore produce uniform effects in the image light from the left waveguide and the image light from the right waveguide as imaged by optical sensor 114. Similarly, any bending or rotation of optical sensor 114 with respect to bridge sensor optics 148 will produce uniform effects in the image light from the left waveguide and the image light from the right waveguide as imaged by optical sensor 114. In other words, any bending or forces applied to nose bridge NB of the housing may produce uniform error for the image light received by the optical bridge sensor from both the left and right waveguides (e.g., without introducing variation between the left image light and the right image light that can be difficult or impossible to calibrate out). However, the uniform error may be easily calibrated out of the optical bridge sensor data (e.g., for use in performing the operations of FIG. 8).

Bridge sensor optics 148 may include any desired optical components such as one or more lenses, prisms, optical wedges, beam splitters, polarizers, polarizing beam splitters, waveplates, waveguides, optical couplers, diffractive gratings (e.g., one or more volume holograms or surface relief gratings), mirrors, reflectors, masking layers, etc. for redirecting image light 38A and 38B towards optical sensor 114. One or more position sensors 16 (FIG. 7) may be mounted to optical sensor 114 and/or optical bridge sensor optics 148.

In the example of FIG. 9, bridge sensor optics 148 include a dedicated optical bridge sensor waveguide such as waveguide 140. Waveguide 140 may at least partially overlap optical sensor 114, waveguide 24A, and/or waveguide 24B. For example, waveguide 140 may have a first end that overlaps waveguide 24A and an opposing second end that overlaps waveguide 24B. Waveguide 140 may be spaced apart (separated) from waveguides 24A and 24B or may be mounted to waveguides 24A and 24B. Waveguide 140 may be spaced apart (separated) from optical sensor 114 or may be mounted to optical sensor 114.

Waveguide 140 may include one or more input couplers 142 such as a first input coupler 142A and a second input coupler 142B. Waveguide 140 may also include one or more output couplers such as output coupler 144. Input coupler 142A may be disposed (mounted) at, on, within, and/or overlapping the first end of waveguide 24A (e.g., input coupler 142A may overlap waveguide 24A). Input coupler 142B may be disposed (mounted) at, on, within, and/or overlapping the second end of waveguide 24B (e.g., input coupler 142B may overlap waveguide 24B). Output coupler 144 may be disposed (mounted) at, on, within, and/or overlapping optical sensor 114. Output coupler 114 may therefore be (laterally) disposed (interposed) on waveguide 144 between input coupler 142A and input coupler 142B.

Output coupler 116A on waveguide 24A may direct image light 38A towards input coupler 142A on waveguide 140. Input coupler 142A may couple image light 38A into waveguide 32 (e.g., at an output angle within the total internal reflection (TIR) range of waveguide 140) and may direct image light 38A towards output coupler 144. Image light 38A may propagate along waveguide 140 towards output coupler 144 via TIR.

Output coupler 116B on waveguide 24B may direct image light 38B towards input coupler 142B on waveguide 140. Input coupler 142B may couple image light 38B into waveguide 32 (e.g., at an output angle within the total internal reflection (TIR) range of waveguide 140) and may direct image light 38B towards output coupler 144 (e.g., in propagation direction opposite the direction with which input coupler 142A directs image light 38A). Image light 38B may propagate along waveguide 140 towards output coupler 144 via TIR (e.g., in a direction opposite to the direction with which image light 38A propagates along waveguide 140 via TIR).

Output coupler 144 may receive image light 38A (e.g., at a first incident angle within the TIR range of waveguide 140) and may receive image light 38B (e.g., at a second incident angle within the TIR range of waveguide 140). Output coupler 144 may couple image light 38A out of waveguide 140 and may direct image light 38A towards optical sensor 114. Output coupler 144 may couple image light 38B out of waveguide 140 and may direct image light 38B towards optical sensor 114. Output coupler 144 may direct image light 38A and image light 38B onto the same field of view on optical sensor 114 (e.g., image light 38A and image light 38B may be superimposed/overlapping in the same field of view at optical sensor 114 to illuminate the same pixels of optical sensor 114). Alternatively, output coupler 144 may direct image light 38A and image light 38B onto different respective fields of view on optical sensor 114 (e.g., image light 38A and image light 38B may illuminate different pixels of optical sensor 114).

Input coupler 142A may include an input coupling prism (e.g., a reflective or transmissive input coupling prism), an angled edge or facet of waveguide 140, one or more partial reflectors or mirrors (e.g., a louvered mirror), a set of diffractive gratings (e.g., a set of volume holograms, a surface relief grating, etc.), or any other desired input coupling optics. Input coupler 142B may include an input coupling prism (e.g., a reflective or transmissive input coupling prism), an angled edge or facet of waveguide 140, one or more partial reflectors or mirrors (e.g., a louvered mirror), a set of diffractive gratings (e.g., a set of volume holograms, a surface relief grating, etc.), or any other desired input coupling optics. Output coupler 144 may include one or more output coupling prisms (e.g., a single output coupling prism that couples both image light 38A and 38B out of waveguide 140 or two output coupling prisms that couple image light 38A and 38B respectively out of waveguide 140), one or more angled edges or facets of waveguide 140, one or more partial reflectors or mirrors (e.g., one or more louvered mirrors, a first mirror that reflects image light 38A and a second mirror that reflects image light 38B, etc.), one or more sets of diffractive gratings, or any other desired output coupling optics.

In implementations where output coupler 144 includes diffractive gratings, output coupler 144 may, for example, include a first set of volume holograms that diffracts image light 38A towards optical sensor 114 and a second set of volume holograms that diffracts image light 38B towards optical sensor 114. The first and second sets of volume holograms may, if desired, be at least partially overlapping on waveguide 140. The first and second sets of volume holograms may, for example, be superimposed within the same volume of a grating medium on waveguide 140. In other examples, output coupler 144 may include a first SRG that diffracts image light 38A and a second SRG that diffracts image light 38B.

Waveguide 140 may include one or more waveguide substrates layered on the grating medium (e.g., where the grating medium is sandwiched between waveguide substrates). If desired, diffractive gratings in input coupler 142A, input coupler 142B, and/or output coupler 144 may all be disposed, embedded, etched, or recorded in the same layer of grating medium on waveguide 140. Alternatively, diffractive gratings in input coupler 142A, input coupler 142B, and/or output coupler 144 may be disposed, embedded, or recorded in different respective layers of grating media on waveguide 140.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In accordance with an embodiment, an electronic device is provided that includes a first projector configured to generate first light, a second projector configured to generate second light, a first waveguide configured to propagate the first light via total internal reflection (TIR), a second waveguide configured to propagate the second light via TIR, a first optical coupler configured to couple a first portion of the first light out of the first waveguide while passing a second portion of the first light, a second optical coupler configured to couple the second portion of the first light out the first waveguide, a third optical coupler configured to couple a first portion of the second light out of the second waveguide while passing a second portion of the second light, a fourth optical coupler configured to couple the second portion of the second light out the second waveguide, an optical sensor and optics configured to direct the second portion of the first light and the second portion of the second light towards the optical sensor.

In accordance with another embodiment, the optical sensor is at least partially interposed between the first waveguide and the second waveguide.

In accordance with another embodiment, the first optical coupler is configured to couple the first portion of the first light out of the first waveguide in a first direction, the second optical coupler is configured to couple the first portion of the second light out of the second waveguide in the first direction, the third optical coupler is configured to couple the second portion of the first light out of the first waveguide in a second direction opposite the first direction, and the fourth optical coupler is configured to couple the second portion of the second light out of the second waveguide in the second direction.

In accordance with another embodiment, the optical sensor is configured to receive the second portion of the first light and the second portion of the first light in the first direction.

In accordance with another embodiment, the optics include a third waveguide.

In accordance with another embodiment, the third waveguide at least partially overlaps the first waveguide, the second waveguide, and the optical sensor.

In accordance with another embodiment, the optics further include a fifth optical coupler configured to couple the second portion of the first light into the third waveguide, a sixth optical coupler configured to couple the second portion of the second light into the third waveguide and a seventh optical coupler configured to couple the second portion of the first light and the second portion of the second light out of the waveguide.

In accordance with another embodiment, the fifth optical coupler includes a first input coupling prism and the sixth optical coupler includes a second input coupling prism.

In accordance with another embodiment, the fifth optical coupler includes a first diffractive grating and the sixth optical coupler includes a second diffractive grating.

In accordance with another embodiment, the optical sensor is configured to generate optical sensor data based on the second portion of the first image light and the second portion of the second image light, the display further includes one or more processors configured to adjust the first image light based on the optical sensor data.

In accordance with an embodiment, an electronic device is provided that includes a first waveguide configured to propagate first light, a second waveguide configured to propagate second light, an optical sensor at least partially between the first waveguide and the second waveguide and a third waveguide configured to direct the first light from the first waveguide towards the optical sensor and configured to direct the second light from the second waveguide towards the optical sensor.

In accordance with another embodiment, the electronic device includes a first optical coupler on the third waveguide and configured to couple the first light into the third waveguide, a second optical coupler on the third waveguide and configured to couple the second light into the third waveguide and a third optical coupler on the third waveguide and configured to couple the first light and the second light out of the third waveguide and towards the optical sensor, the third optical coupler being interposed between the first optical coupler and the second optical coupler on the third waveguide.

In accordance with another embodiment, the first optical coupler includes a first diffractive grating and the second optical coupler includes a second diffractive grating.

In accordance with another embodiment, the first diffractive grating includes a first surface relief grating (SRG) and the second diffractive grating includes a second SRG.

In accordance with another embodiment, the first diffractive grating includes a first volume hologram and the second diffractive grating includes a second volume hologram.

In accordance with another embodiment, the third optical coupler includes a third diffractive grating.

In accordance with another embodiment, the third waveguide includes a layer of grating medium that includes the first, second, and third diffractive gratings.

In accordance with another embodiment, the third optical coupler includes an output coupling prism.

In accordance with another embodiment, the first optical coupler includes a first input coupling prism and the second optical coupler includes a second input coupling prism.

In accordance with an embodiment, an electronic device is provided that includes a housing having a first portion, a second portion, and a nose bridge that couples the first portion to the second portion, a first projector in the first portion of the housing and configured to produce first light, a first waveguide in the first portion of the housing and configured to propagate the first light, a second projector in the second portion of the housing and configured to produce second light, a second waveguide in the second portion of the housing and configured to propagate the second light, an optical sensor in the nose bridge and a third waveguide in the nose bridge and at least partially overlapping the optical sensor, the first waveguide, and the third waveguide, the third waveguide is configured to direct the first light from the first waveguide towards the optical sensor and is configured to direct the second light from the second waveguide towards the optical sensor.

The foregoing is merely illustrative and various modifications can be made to the described embodiments. The foregoing embodiments may be implemented individually or in any combination.

What is claimed is:

1. An electronic device comprising:
   a first projector configured to generate first light;
   a second projector configured to generate second light;
   a first waveguide configured to propagate the first light via total internal reflection (TIR);
   a second waveguide configured to propagate the second light via TIR;
   a first optical coupler configured to couple a first portion of the first light out of the first waveguide in a first direction while passing a second portion of the first light;
   a second optical coupler configured to couple the second portion of the first light out of the first waveguide in a second direction opposite the first direction;

a third optical coupler configured to couple a first portion of the second light out of the second waveguide while passing a second portion of the second light;

a fourth optical coupler configured to couple the second portion of the second light out of the second waveguide;

an optical sensor; and optics configured to direct the second portion of the first light and the second portion of the second light towards the optical sensor.

2. The electronic device of claim 1, wherein the optical sensor is at least partially interposed between the first waveguide and the second waveguide.

3. The electronic device of claim 2, wherein the third optical coupler is configured to couple the first portion of the second light out of the second waveguide in the first direction and the fourth optical coupler is configured to couple the second portion of the second light out of the second waveguide in the second direction.

4. The electronic device of claim 3, wherein the optical sensor is configured to receive the second portion of the first light and the second portion of the first second light in the first direction.

5. The electronic device of claim 1, wherein the optics comprise a third waveguide.

6. The electronic device of claim 5, wherein the third waveguide at least partially overlaps the first waveguide, the second waveguide, and the optical sensor.

7. The electronic device of claim 5, wherein the optics further comprise:

a fifth optical coupler configured to couple the second portion of the first light into the third waveguide;

a sixth optical coupler configured to couple the second portion of the second light into the third waveguide; and a seventh optical coupler configured to couple the second portion of the first light and the second portion of the second light out of the third waveguide.

8. The electronic device of claim 7, wherein the fifth optical coupler comprises a first input coupling prism and the sixth optical coupler comprises a second input coupling prism.

9. The electronic device of claim 7, wherein the fifth optical coupler comprises a first diffractive grating and the sixth optical coupler comprises a second diffractive grating.

10. The electronic device of claim 1, wherein the optical sensor is configured to generate optical sensor data based on the second portion of the first light and the second portion of the second light, a display further comprising:

one or more processors configured to adjust the first image light based on the optical sensor data.

11. An electronic device comprising:

a first waveguide configured to propagate first light via total internal reflection between a first surface and a second surface;

a second waveguide configured to propagate second light via total internal reflection between a third surface and a fourth surface;

an optical sensor between the first waveguide and the second waveguide; and a third waveguide having a fifth surface and a sixth surface and configured to direct the first light from the first waveguide towards the optical sensor and configured to direct the second light from the second waveguide towards the optical sensor, wherein the fifth surface of the third waveguide faces the optical sensor, the second surface of the first waveguide, and the fourth surface of the second waveguide.

12. The electronic device of claim 11, further comprising:

a first optical coupler on the third waveguide and configured to couple the first light into the third waveguide;

a second optical coupler on the third waveguide and configured to couple the second light into the third waveguide; and a third optical coupler on the third waveguide and configured to couple the first light and the second light out of the third waveguide and towards the optical sensor, the third optical coupler being interposed between the first optical coupler and the second optical coupler on the third waveguide.

13. The electronic device of claim 12, wherein the first optical coupler comprises a first diffractive grating and the second optical coupler comprises a second diffractive grating.

14. The electronic device of claim 13, wherein the first diffractive grating comprises a first surface relief grating (SRG) and the second diffractive grating comprises a second SRG.

15. The electronic device of claim 13, wherein the first diffractive grating comprises a first volume hologram and the second diffractive grating comprises a second volume hologram.

16. The electronic device of claim 13, wherein the third optical coupler comprises a third diffractive grating.

17. The electronic device of claim 16, wherein the third waveguide includes a layer of grating medium that includes the first, second, and third diffractive gratings.

18. The electronic device of claim 13, wherein the third optical coupler comprises an output coupling prism.

19. The electronic device of claim 12, wherein the first optical coupler comprises a first input coupling prism and the second optical coupler comprises a second input coupling prism.

20. An electronic device comprising:

a housing having a first portion, a second portion, and a nose bridge that couples the first portion to the second portion;

a first projector in the first portion of the housing and configured to produce first light;

a first waveguide in the first portion of the housing and configured to propagate the first light;

a second projector in the second portion of the housing and configured to produce second light;

a second waveguide in the second portion of the housing and configured to propagate the second light;

an optical sensor in the nose bridge; and a waveguide in the nose bridge and at least partially overlapping the optical sensor, the first waveguide, and the third second waveguide, wherein the first waveguide is configured to direct the first light towards the third waveguide in a first direction and the second waveguide is configured to direct the second light towards the third waveguide in the first direction, and wherein the third waveguide is configured to direct the first light from the first waveguide towards the optical sensor in a second direction opposite the first direction and is configured to direct the second light from the second waveguide towards the optical sensor in the second direction.

* * * * *